United States Patent
Ranjan et al.

(10) Patent No.: US 11,748,487 B2
(45) Date of Patent: Sep. 5, 2023

(54) DETECTING A POTENTIAL SECURITY LEAK BY A MICROSERVICE

(71) Applicant: Hewlett Packard Enterprise Development LP, Houston, TX (US)

(72) Inventors: Jyoti Ranjan, Bangalore Karnataka (IN); Prabhu Murthy, Bangalore Karnataka (IN); Ajay Kumar Bajaj, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 269 days.

(21) Appl. No.: 16/856,702

(22) Filed: Apr. 23, 2020

(65) Prior Publication Data
US 2021/0334384 A1    Oct. 28, 2021

(51) Int. Cl.
| | |
|---|---|
| *G06F 21/57* | (2013.01) |
| *G06F 9/54* | (2006.01) |
| *G06F 11/07* | (2006.01) |
| *G06F 11/36* | (2006.01) |
| *G06F 21/62* | (2013.01) |

(52) U.S. Cl.
CPC ............ *G06F 21/577* (2013.01); *G06F 9/547* (2013.01); *G06F 11/0766* (2013.01); *G06F 11/3636* (2013.01); *G06F 11/3664* (2013.01); *G06F 11/3688* (2013.01); *G06F 21/6227* (2013.01)

(58) Field of Classification Search
CPC .... G06F 21/577; G06F 9/547; G06F 11/0766; G06F 11/3636; G06F 11/3664; G06F 11/3688; G06F 21/6227; G06F 11/3684
See application file for complete search history.

(56) References Cited

U.S. PATENT DOCUMENTS

| | | | |
|---|---|---|---|
| 11,132,278 B2* | 9/2021 | Joyce | G06F 11/3604 |
| 2011/0307860 A1* | 12/2011 | Park | G06F 11/3688 |
| | | | 717/145 |
| 2018/0039565 A1* | 2/2018 | Rajagopalan | G06F 11/3476 |
| 2018/0089011 A1* | 3/2018 | Basiri | G06F 11/3006 |
| 2018/0239692 A1* | 8/2018 | Kalyanasundram | G06F 11/273 |
| 2019/0037084 A1* | 1/2019 | Mandry | H04N 1/00063 |
| 2019/0387017 A1* | 12/2019 | Martynenko | H04L 63/1425 |
| 2020/0110654 A1* | 4/2020 | Oleszkiewicz | G06F 11/0781 |

(Continued)

OTHER PUBLICATIONS

API Security Testing: Rules and Checklists, https://www.testbytes.net, Sep. 28, 2018, 18 pages.

(Continued)

*Primary Examiner* — Daxin Wu
(74) *Attorney, Agent, or Firm* — Slater Matsil, LLP

(57) ABSTRACT

Embodiments described herein are generally directed to testing a microservice to determine whether the microservice leaks sensitive information. According to an example, prior to deployment of a microservice within a production environment, a test suite for the microservice is generated based at least in part on a specification of an application programming interface (API) of the microservice defining operations supported by the API and information regarding parameters of each of the operations. The microservice is subjected to the test suite. A potential security leak by the microservice is then detected by analyzing a dataset to which the microservice outputs information, including applying security rules to the dataset.

23 Claims, 8 Drawing Sheets

(56) References Cited

U.S. PATENT DOCUMENTS

2020/0233793 A1* 7/2020 Ahamed ................ G06F 9/54
2020/0302050 A1* 9/2020 Jain ..................... G06F 21/51
2020/0366697 A1* 11/2020 Vittal ................... H04L 63/20
2021/0042207 A1* 2/2021 Joyce ................... G06F 21/53

OTHER PUBLICATIONS

Lumetta, Jake. "These are the most effective microservice testing strategies, according to the experts", Microservices, Jun. 18, 2018, www.freecodecamp.org/news/these-are-the-most-effective-microservice-testing-strategies-according-to-the-experts-6fb584f2edde/, downloaded Feb. 3, 2020, 21 pages.

Sridharan, Cindy, Testing Microservices, the sane way, Dec. 30, 2017, https://medium.com/@copyconstruct/testing-microservices-the-sane-way-9bb31d58c16, downloaded Feb. 3, 2020, 37 pages.

NeuVector, "End-to-End Kubernetes Protection", Kubernetes Security, available online at <https://web.archive.org/web/20190927040843/https://neuvector.com/kubernetes-security-solutions/>, Sep. 27, 2019, 5 pages.

\* cited by examiner

DETECTING A POTENTIAL SECURITY LEAK BY A MICROSERVICE

BACKGROUND

DevOps (a combination of software development (Dev) and information-technology (IT) operations (Ops)), microservices, and containerization and have changed the way applications are represented, developed, tested and deployed.

DevOps is a set of practices that automates the processes between software development and IT teams that seeks to facilitate building, testing, and releasing of software faster and more reliably. DevOps involves continuous planning, continuous testing, continuous integration, and other forms of continuous evolution of both the project and the software.

Microservice architecture takes advantage of the fact that applications are simpler to build and maintain when broken down into smaller pieces that work seamlessly together. As such, in contrast to the more traditional monolithic application architectures, the microservice architecture is an architectural style that structures an application as a collection of smaller, more specialized parts called services (or microservices), each of which communicate with one another across common interfaces (e.g., application programming interfaces (APIs) and representational state transfer (REST) interfaces, like Hypertext Transfer protocol (HTTP). Microservices are increasingly being used in the development world as developers work to create larger, more complex applications that are better developed and managed as a combination of smaller services that work cohesively together for more extensive, application-wide functionality.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
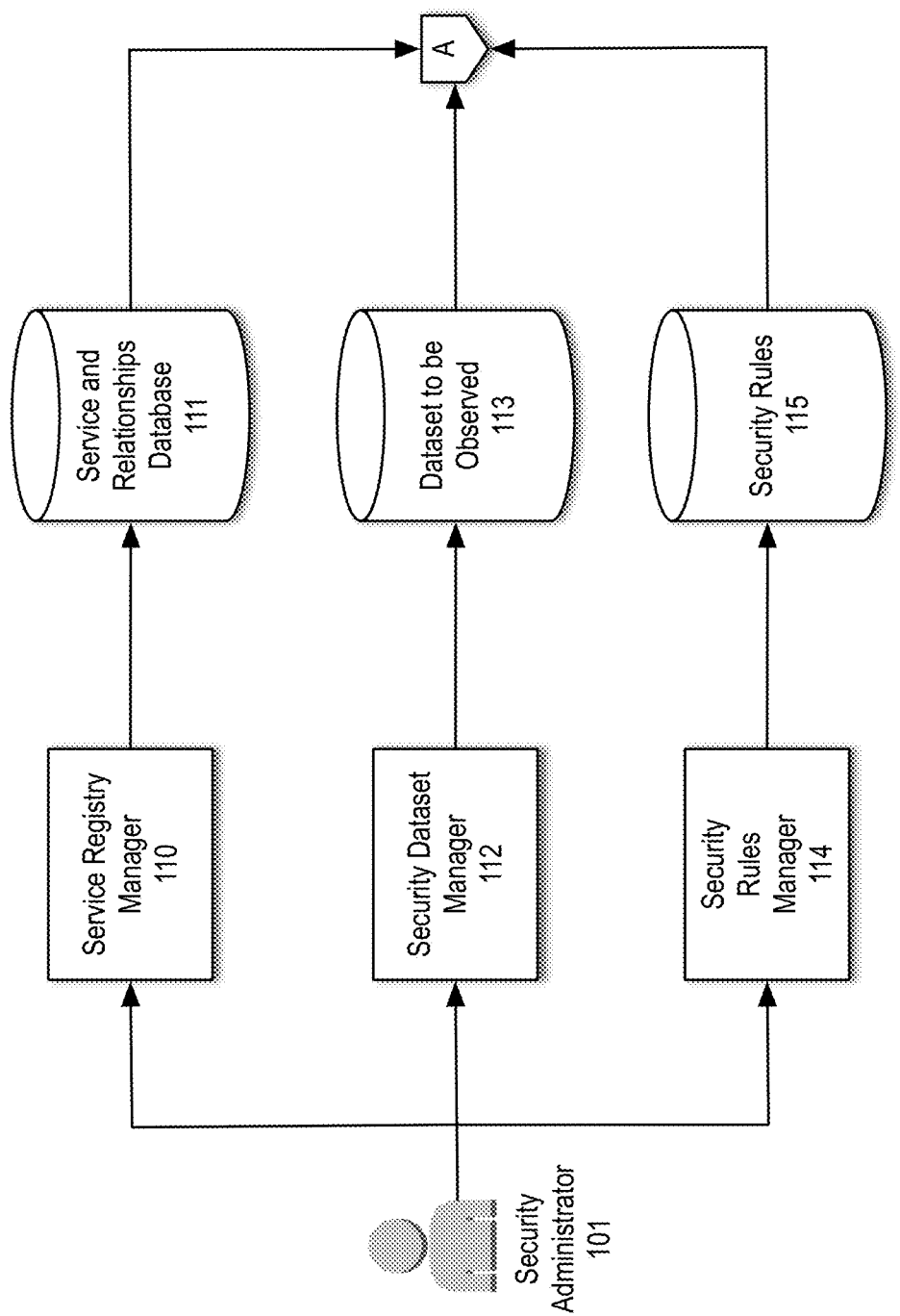
FIGS. 1A-C are block diagrams conceptually illustrating components of a security leak detection system for microservices in accordance with an example embodiment.

Embodiments described herein are generally directed to testing a microservice to determine whether the microservice leaks sensitive information. In the following description, numerous specific details are set forth in order to provide a thorough understanding of example embodiments. It will be apparent, however, to one skilled in the art that embodiments described herein may be practiced without some of these specific details.

Cloud computing is ubiquitous due to the maturity, robustness, flexibility, and simplicity of the underlying cloud computing architecture. Microservices and containerization are rapidly becoming the de-facto standard for building and deploying cloud-based applications. Using a microservice architecture, a complex application can be rapidly deployed by structuring the application as a collection of loosely coupled services (typically, referred to as "microservices") representing standalone functional units that can be independently developed in parallel by small teams of developers. Building applications based on microservices has many advantages including the ability to scale, encouraging adherence to solid design principles, and the ease of deployment, reconfiguration, upgrading, and testing. At the same time, however, it is very common for a micro services based system of moderate size to include 30, 40, 50 or more microservices.

The significant volume of interactions among microservices and the increased expectation of DevOps have compounded the potential for security risks. For example, the surface area of interaction among microservices has increased significantly. Additionally, developers have less time to harden the system against attacks. Meanwhile, high-profile security breaches continue to increase as hackers have gained years of insights in system functioning and are also equipped with new sets of tools and techniques for use in discovering system vulnerabilities.

In order to address security breaches, companies have adapted their application security policies in an attempt to detect and prevent stealing of sensitive information. One step in this direction involves detecting leakage of sensitive information by an application. Existing approaches for attempting to identify potential sources of leakage of sensitive information include:

Security architecture review

Code scanning using security tools

Adherence to standard libraries than custom libraries

Adherence to strong authentication and authorization system etc.

Adherence to techniques like encryption of data in rest, cryptographic algorithm, usage of keys etc.

Due to the volume of inter-communications among microservices to carry out certain operations, the service mesh, which may resemble a spider web, may make it difficult to detect potential leakage of sensitive information by microservices by simply analyzing system behavior using traditional static tools, code analysis, and/or security architecture reviews. It is not that such techniques are not required, but rather would benefit by being complimented or augmented by a security leak detection system as proposed by various embodiments described herein.

While the above-listed approaches are certainly helpful in connection with reducing the potential for security leaks, they do not specifically address the potential for leakage of sensitive information by a microservice during failure scenarios, for example, via the call stack, application programming interface (API) responses or logs. Hackers attempt to trigger failure scenarios by knowingly passing invalid input to a service, for example, to reveal underlying behavior and/or implementation details (e.g., usage of a particular database component, message broker, third party libraries, etc.) of the system. This information can then be used by a hacker to develop a targeted attack against the system.

Embodiments described herein relate to an adaptable security leak detection system that may itself be deployed in the form of a microservice along with microservices to be observed/tested for potential leakage of sensitive information. For example, the system may analyze various pre-defined data sets produced by microservices to scan them for pre-defined security leak patterns. Predefined data sets can be service logs, call stack traces, API responses during positive as well as negative use cases. Non-limiting examples of predefined security rules include:
- There should be no leakage of credential or authorization tokens (e.g., an auth-token) or session tokens.
- Failed call trace should not leak service component details (e.g., message broker endpoint, Identity and Access Management (IAM) endpoint, database table names, etc.).
- Error messages, when a failure occurs, should be generic. For example, an error message should neither indicate the name of peer-services nor disclose their data to end users so that they gain insight about the system design (e.g., library version and service database details) and its functioning pattern.
- Invalid input or stress testing should not fail the service. The service should gracefully reject such requests without exposing its internal details.
- During failure, the service instance should not leave a session (e.g., a Hypertext Transport Protocol (HTTP) session, a database session, a shell session (e.g., Secure Shell (SSH)), for example, to access servers) open.
- Ensuring the service does not run too long without having changes committed. For example, information added to a configuration file (e.g., proxy, environment variables, and the like) should either be committed or the changes should be reverted.

As described further below, in embodiments, the security leak detection system may run in two different modes, including a proactive mode of leak detection during a promotion phase and a reactive mode of leak detection during a production phase. According to one embodiment, during a promotion phase, the security leak detection system may be run as a gate job (e.g., as an automated phase of a continuous deployment process) before promoting a new or updated microservice from a development environment to a production environment. Additionally, the security leak detection system may be deployed within the production environment to monitor pre-defined data sets generated by microservices as they run in the production environment.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "specification of an API," an "API specification," a "definition of an API," and an "API definition" generally refer to documentation regarding an API that provides an understanding of how the API behaves and how the API links with other APIs. For example, an API specification may explain how the API functions and the results to expect when using the API. An API specification may provide information regarding one or more of available endpoints, operations on each endpoint, types of input and output parameters for each operation, formats of the parameters, valid ranges of values of the parameters, and whether the parameters are required or optional. Some API specifications are aimed at consumption by humans and others are intended for machine consumption (e.g., automated tools). A non-limiting example of an API specification format for REST APIs is the OpenAPI Specification (formerly, the Swagger Specification).

As used herein a "dataset" or a "service dataset" generally refers to one or more outputs generated by one or more microservices. Non-limiting examples of a dataset include files, error logs, debug logs, service logs, reports, stack traces, call stack traces, information presented to a user interface, and responses (e.g., error messages) generated by operations of an API. In embodiments described herein, a dataset to be monitored by include predefined outputs and/or outputs defined by a security administrator that are to be monitored and to which a set of security rules may be applied.

As used herein a "security rule" generally refers to one or more conditions defining a security violation. In the context of embodiments described herein, security rules may define text string patterns and/or regular expressions, which when matched against a dataset indicate existence of leakage of sensitive information (e.g., a credential or authorization token, a session token, service component details (e.g., information regarding a message broker endpoint, information regarding an IAM endpoint, database names, database table names, information regarding an image repository (e.g., an Amazon Web Services (AWS) Elastic Container Registry (ECR)), etc.)).

FIG. 1A is a block diagram conceptually illustrating various components that may be used to set up a security leak detection system in accordance with an example embodiment. In the context of the present example, a security administrator 101 may interact with a service registry manager 110, a security dataset manager 112 and a security rules manager 114 to persist information to a service and relationships database 111, a dataset to be observed 113, and a security rules database 115.

The service registry manager 110 may be responsible for persisting information to the service and relationships database 111. In one embodiment, the security administrator 101 may register details regarding an application or service instance with the service registry manager 110. For example, the security administrator 101 may register the application and credentials for accessing data associated with the service dataset. The security administrator 101 may also provide a specification of the API of the microservice that is to be proactively tested prior to deployment within the production environment and/or reactively monitored after it is deployed within the production environment for potential leakage of sensitive information. Similar information may also be provided for peer microservices with which the microservice under test interacts.

The security dataset manager 112 may be responsible for defining sets of data 113 produced by microservices to be observed for leak detection. A dataset may be common across a majority of services, in which case, the files, logs, failed call stack traces and the like, may be predefined. Some specific services may have additional datasets. For example, the security administrator 101 may wish to perform security leak detection on data being displayed to the end user for a user interface (UI) based microservice. As such, in some embodiments, the security dataset manager 112 may facilitate customization of the dataset to be monitored for the microservice under test. Depending upon the particular implementation, all or some portion of the dataset may be predefined or all or some portion of the dataset may be input by the security administrator 101.

The security rules manager 114 may be responsible for defining a set of security rules to which the dataset produced by the microservices are to be subjected. Individual microservices may use different subsets of service components (e.g., databases, message brokers, storage disks, etc.). As such, the security rules manager may facilitate definition by the security administrator 101 of a common set of security rules for all micro services along with the flexibility to customize the security rules for each microservice.

Figure 1B:
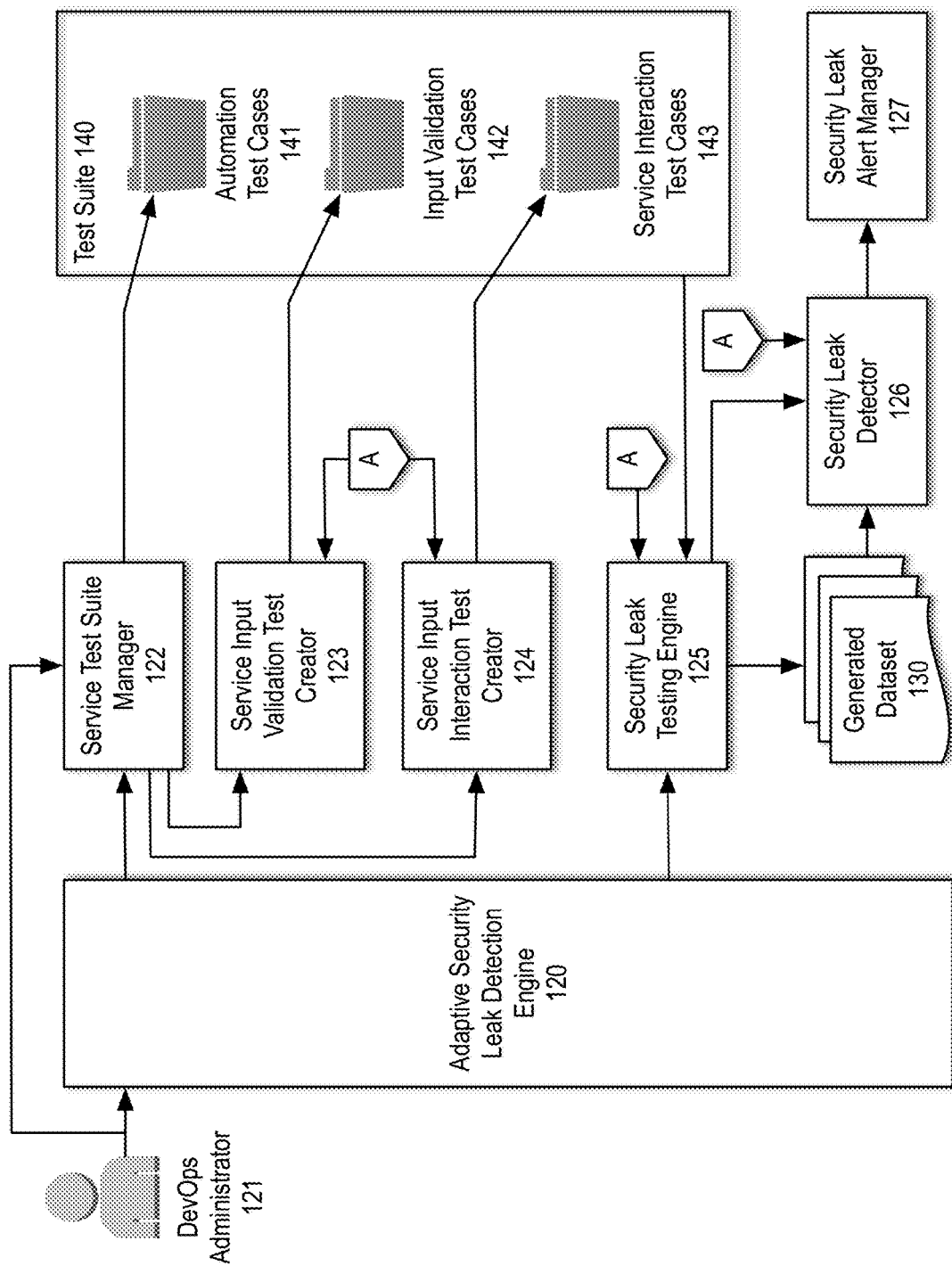

FIG. 1B is a block diagram conceptually illustrating various components that may be used to implement a promotion phase of a security leak detection system in accordance with an example embodiment. In one embodiment, the security leak detection system may run in two different modes, including a proactive mode of leak detection during a promotion phase and a reactive mode of leak detection during a production phase. For example, during a promotion phase (e.g., before promoting a new or updated microservice from a development environment to a production environment), the security leak detection system may be run on the new or updated microservice before deploying the new or updated microservice to the production environment. A non-limiting example of proactive mode processing that may be performed by the security leak detection system is described further below with reference to FIG. 4.

In the context of the present example, in addition to various components that may be used to set up the security leak detection system, examples of which were described above with reference to FIG. 1A, the security leak detection system also includes an adaptive security leak detection engine 120, a service test suite manager 122, a service input validation test creator 123, a service input interaction test creator 124, a security leak testing engine 125, a security leak detector 126, a security leak alert manager 127, and a test suite 140.

Responsive to input from a DevOps administrator 121, (i) the adaptive security leak detection engine 120 may be responsible for initiating the security leak detection system, including directing the service test suite manager 122 to create appropriate test cases and (ii) initiating the security leak detection process by directing the security leak testing engine 125 to run the test suite 140 to subject the microservice under test to various test cases.

The service test suite manager 122 may be responsible for coordinating the creation and storage of automation test cases 141. According to one embodiment, the test suite 140 to which a microservice under test is subjected to in order to validate the microservice under test includes automation test cases 141, input validation test cases 142, and service interaction test cases 143. In the context of the present example, automation test cases 141 may be imported into the security leak detection system responsive to the DevOps administrator 121 registering various automation tests (e.g., those previously developed by a quality engineering (QE) team) that may be used to validate the microservice under test, which may be persisted, for example, as files in the security leak detection system. The service test suite manager 122 may direct the service input validation test creator 123 to create the input validation test cases 142 and may direct the service input interaction test creator 124 to create the service interaction test cases 142. A non-limiting example of test suite preparation processing is described further below with reference to FIG. 3.

In the context of the present example, the service input validation test creator 123 is responsible for creating the input validation test cases 142. The input validation test cases 142 should represent a rigorous set of tests that fully exercise all REST calls that can be made to the microservice under test. Depending upon the particular implementation, creation of the input validation test cases may be performed in a fully automated manner, a semi-automated manner, via a manual mechanism, or a combination of automated and manual processes. According to one embodiment, the service input validation test creator 123 implements a mechanism to create detailed input test suites based on published or public interfaces of the microservice under test. As described in further detail below, the service input validation test creator 123 may retrieve an API specification (e.g., the OpenAPI specification or Swagger specification) for the microservice under test and analyze it to create a test suite for each REST call that may be made to the microservice under test. For example, the service input validation test creator 123 may obtain the API specification from a service and relationships database (e.g., service and relationships database 111) previously configured by a security administrator (e.g., security administrator 101).

The service input interaction test creator 124 may be responsible for creating the service interaction test cases 143, that subject the microservice under test to rigorous test scenarios to evaluate whether the microservice under test leaks sensitive information relating to the microservices with which it interacts. According to one embodiment, the service input interaction test creator 124 assumes the microservice under test will be surrounded by mocked versions of the microservices with which the microservice under test interacts and based on the API specifications of the mocked microservices creates the service interaction test cases 143. In one embodiment, the service interaction test cases 143 include test cases in which the mocked services provide positive responses (e.g., responses with valid parameter values) and negative responses (e.g., responses with invalid parameter values). As described in further detail below, the service input interaction test creator 124 may retrieve the API specifications (e.g., the OpenAPI specifications or Swagger specifications) for the mocked microservices (e.g., from a service and relationships database (e.g., service and relationships database 111)) and analyze the API specifications to create the desired array of test cases. For example, the service input interaction test creator 124 may create test cases to test for leakage of sensitive information relating to the mocked microservices and/or propagation of leaked sensitive information by the mocked service under both positive and negative response scenarios.

Turning now to the security leak testing engine 125, it may be responsible for subjecting the microservice under test to the test suite 140 prepared by the service test suite manager 122, the service input validation test creator 123, and the service input interaction test creator 124. In one embodiment, the security leak testing engine 125, creates a testing environment in which the microservice under test can be tested, creates mocked peer microservices based on their respective API specifications, runs the test suite 140 against the microservice under test, and collects the results of the testing in generated dataset 130. The data selected to be included in generated dataset 130 may be based on a preconfigured dataset (e.g., dataset to be observed 113).

In the context of the present example, security leak detector 126 is responsible for applying the security rules (e.g., security rules 115) to the generated dataset 130 to identify any patterns that are indicative of leakage of sensitive information. If any security rules are violated, the security leak detector 126 may report such violations to the security leak alert manager 127.

According to one embodiment, the security leak alert manager 127 is responsible for notifying appropriate development or testing personnel (e.g., the DevOps administrator 121, the QE team and/or the development team) regarding any identified security leak patterns. For example, the security leak alert manager may use various mechanisms (e.g., email, a dashboard associated with the security leak detection system or a personalized text message) to alert the appropriate personnel so as to allow appropriate risk mitigation steps to be taken prior to deployment of the micro service under test to the production environment.

Figure 1C:
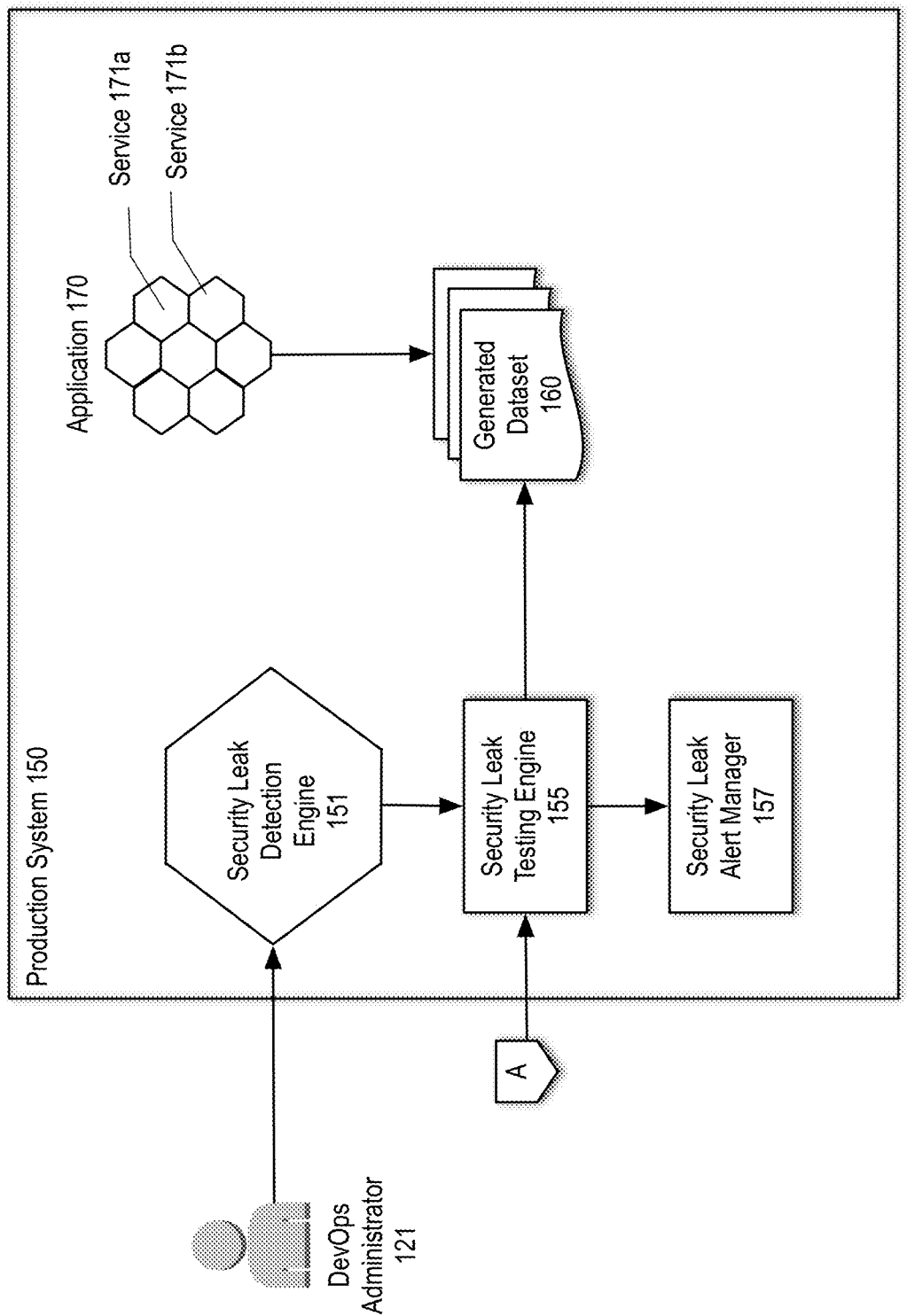

FIG. 1C is a block diagram conceptually illustrating various components that may be used to implement a production phase of a security leak detection system in accordance with an example embodiment. As noted above, the security leak detection system may run in two different modes, including a proactive mode of leak detection during a promotion phase and a reactive mode of leak detection during a production phase. The present example illustrates a potential architecture that may be used to implement the reactive mode. A non-limiting example of reactive mode processing that may be performed by the security leak detection system is described further below with reference to FIG. 5.

In the context of the present example, in addition to various components that may be used to set up the security leak detection system, examples of which were described above with reference to FIG. 1A, the security leak detection system also includes a production system 150 including a security leak detection engine 151, a security leak testing engine 155, a security leak alert manager 157, and an application that includes multiple microservices (e.g., services 171*a-b*) all or some portion of which may be monitored for potential leakage of sensitive information.

According to one embodiment, the security leak detection engine 151 is deployed in the form of a microservice within protection system 150 to periodically run a security detection process to cause the security leak testing engine 155 to monitor one or more microservices making up a production application (e.g., application 170). In this manner, after a microservice (e.g., service 171*a-b*) has been promoted from the development environment to the production environment (e.g., production system 150), the security leak detection system may continue to identify potential leakage of sensitive information by microservices making up the application 170.

Security leak testing engine 155 may operate similar to security leak testing engine 125 and security leak detector 126 of FIG. 1B, but within production system 150 and without making use of the test suite 140. Instead, the security leak testing engine 155 may monitor the results of production interactions of application 170 with end users (not shown) that are stored in generated dataset 160. The generated dataset 160 may be based on a preconfigured dataset (e.g., dataset to be observed 113). Additionally security leak testing engine 155 may applying security rules (e.g., security rules 115) to the generated dataset 160 to identify any patterns that are indicative of leakage of sensitive information. If any security rules are violated, the security leak testing engine 155 may report such violations to the security leak alert manager 157, which may operate in a manner similar to the security leak alert manager 127 described with reference to FIG. 1B.

While in the context of the present example, the security administrator 101 and the DevOps administrator 121 are shown separately, those skilled in the art will appreciate that such roles may be one and the same or split into additional roles.

The various managers, engines, and creators described above with reference to FIGS. 1A-C and the processing described below with reference to the flow diagrams of FIG. 2-5 may be implemented in the form of executable instructions stored on a non-transitory machine readable medium and executed by a hardware processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 6 below.

Figure 2:
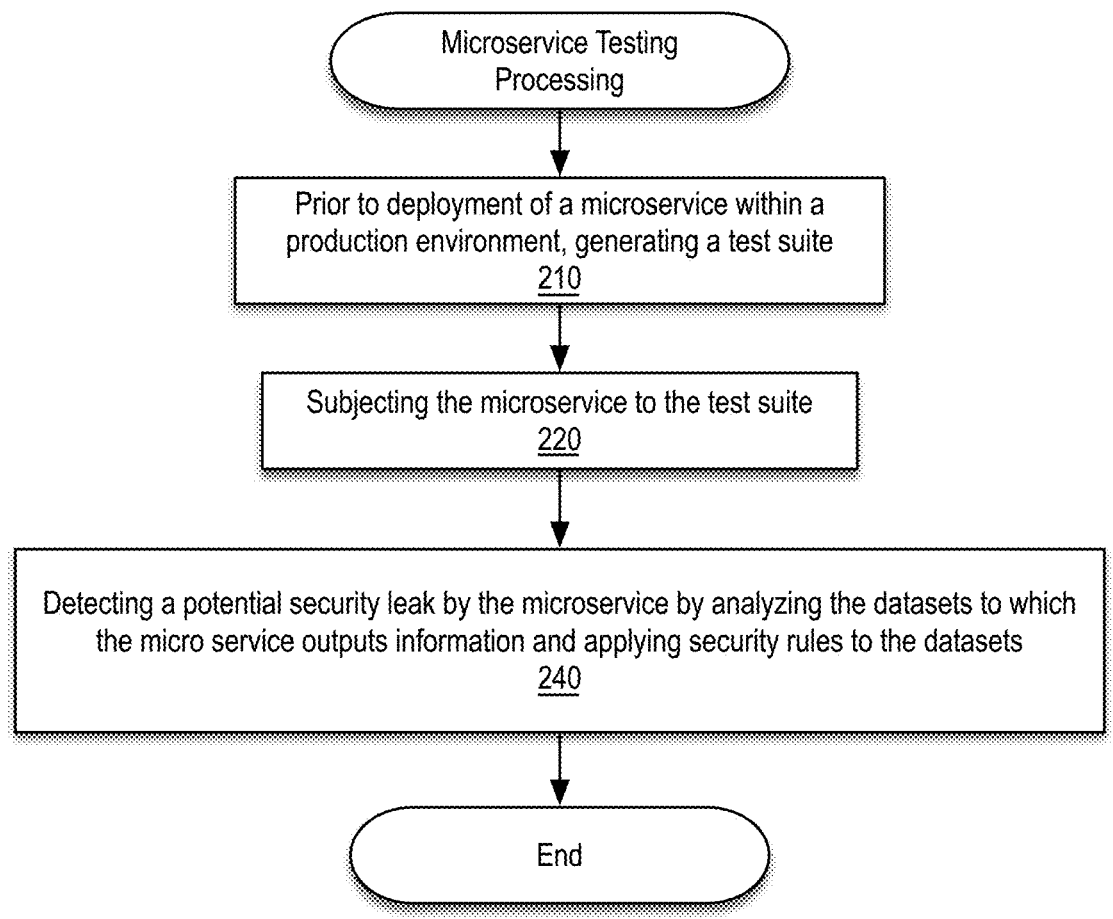
FIG. 2 is a flow diagram illustrating microservice testing processing in accordance with an example embodiment.

FIG. 2 is a flow diagram illustrating microservice testing processing in accordance with an example embodiment. According to one embodiment, this microservice testing processing may be performed as a gate job responsive to a request by a development team to promote a new or updated microservice from a development environment to a production environment (e.g., production system 150). Alternatively, this microservice testing may be performed as part of an automated phase of a continuous deployment process before promoting a new or updated microservice to the production environment.

At block 210, prior to deployment of a microservice within a production environment, a test suite is generated. According to one embodiment, the test suite (e.g., test suite 140) may include one or more of automation test cases (e.g., automation test cases 141), input validation test cases (input validation test cases 142), and service interaction test cases (e.g., service interaction test cases 143).

At block 220, the microservice is subjected to the test suite. According to one embodiment, a security leak testing engine (e.g., security leak testing engine 125), creates a testing environment in which the microservice under test can be tested, creates mocked peer microservices based on their respective API specifications, runs the test suite against the microservice under test, and collects the results of the testing in a generated dataset (e.g., generated dataset 130), which may be defined by a preconfigured dataset (e.g., dataset to be observed 113) to include a preconfigured set of files, logs, call stack traces and the like, potentially customized by an administrator (e.g., security administrator 101) to include data being displayed to an end user for a UI-based microservice.

At block 230, the datasets to which the microservice outputs information are analyzed to detect a potential security leak by the microservice by applying security rules to the generated datasets. According to one embodiment, a security leak detector (e.g., security leak detector 126) may apply a set of predefined security rules (e.g., security rules 115) to the generated datasets. In one embodiment, the security rules may define text string patterns and/or regular expressions, which when matched against the generated dataset indicate existence of leakage of sensitive information (e.g., a credential or authorization token, a session token, service component details (e.g., information regarding a message broker endpoint, information regarding an IAM endpoint, database names, database table names, information regarding an image repository (e.g., an Amazon Web Services (AWS) Elastic Container Registry (ECR)), etc.)) by the microservice.

Figure 3:
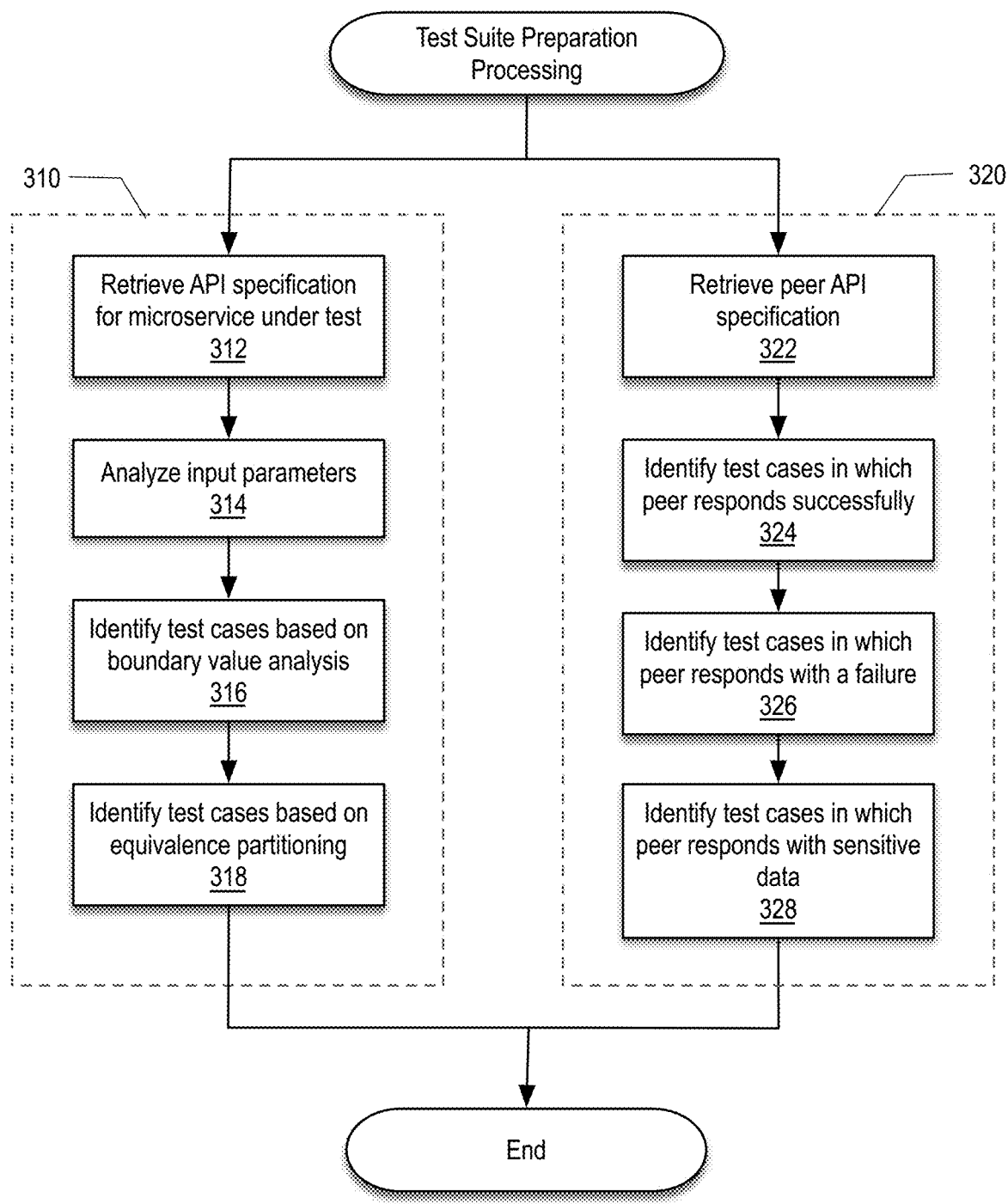
FIG. 3 is a flow diagram illustrating test suite preparation processing in accordance with an example embodiment.

FIG. 3 is a flow diagram illustrating test suite preparation processing in accordance with an example embodiment. According to one embodiment, test suite preparation processing is performed by or directed by a service test suite manager (e.g., service test suite manager 122). In the context of the present example, two types of test cases are created, (i) input validation test cases (e.g., input validation test cases 142), representing test cases intended to test every REST API of the microservice under test, and (ii) service interaction test cases (e.g., service interaction test cases 143), representing test cases intended to facilitate mocked peer microservice to respond to requests made by the microservice under test to a peer microservice REST API.

At block 310, the input validation test cases are generated by repeating blocks 312-318 for every REST API of the microservice under test. At block 320, the service interaction test cases are generated by repeating blocks 322-328 for every peer microservice of the microservice at issue. Blocks 310 and 320 may be performed in parallel or sequentially. For example, block 310 may be performed prior to or after block 320. Also, various of the blocks of FIG. 3 may be performed in an order different than depicted. For example, as those skilled in the art will appreciate, blocks that are not dependent upon the output or prior performance of a particular block or blocks may be performed prior to or concurrently with the particular block or blocks.

At block 312, the API specification of a REST API for the microservice under test is retrieved. For example, a service input validation test creator (e.g., service input validation test creator 123) may retrieve an OpenAPI specification or Swagger specification for the current REST API of the microservice under test from a service and relationships database (e.g., service and relationships database 111).

At block 314, the input parameters of the REST API are analyzed. For example, the data types and ranges of values of the input parameters may be taken into consideration in connection with creating the input validation test cases.

At block 316, test cases are identified based on boundary value analysis. As those skilled in the art will appreciate, in the context of software testing, boundary value analysis generally refers to the use of tests that are designed to include representatives of boundary values in a range. A variety of existing tools that implement boundary value analysis may be used to auto-generate the desired test cases. Depending upon the particular implementation, an administrator may supplement auto-generated tests cases with one or more specific test cases desired to be exercised by the administrator.

At block 318, test cases are identified based on equivalence partitioning. As those skilled in the art will appreciate, in the context of software testing, the input data of a particular software unit may be divided into partitions of equivalent data from which test cases can be derived. Typically, test cases are designed to cover each partition at least once. A variety of existing tools that implement equivalence partitioning may be used to auto-generate the desired test cases. Depending upon the particular implementation, an administrator may supplement auto-generated tests cases with one or more specific test cases desired to be exercised by the administrator. While in the context of the present example, both boundary value analysis and equivalence class partitioning are described and being used to create the input validation test cases, in some embodiments, the service input validation test creator may use neither boundary value analysis nor equivalence class partitioning to create the input validation test, one approach, but not the other, or both approaches.

At block 322, the API specification of a REST API of a peer microservice to the microservice under test is retrieved. For example, a service input interaction test creator (e.g., service input interaction test creator 124) may retrieve an OpenAPI specification or Swagger specification for the peer microservice from the service and relationships database.

At block 324, test cases in which the peer microservice is to respond successfully are identified. For example, the service input interaction test creator may generate test cases in which the REST API of the peer microservice returns valid values to the microservice under test for one or more return parameters.

At block 326, test cases in which the peer microservice is to respond with a failure are identified. For example, the service input interaction test creator may generate test cases in which the REST API of the peer microservice returns invalid values to the microservice under test for one or more return parameters or otherwise returns a failure condition to the microservice under test.

At block 328, test cases in which the peer microservice responds with sensitive data are identified. For example, the service input interaction test creator may generate test cases in which the REST API of the peer microservice leaks sensitive data (e.g., via files, logs, failed call stack traces, API responses, and the like) to allow a determination to be made regarding whether the microservice under test propagates the leakage of sensitive information by the peer microservice.

Figure 4:
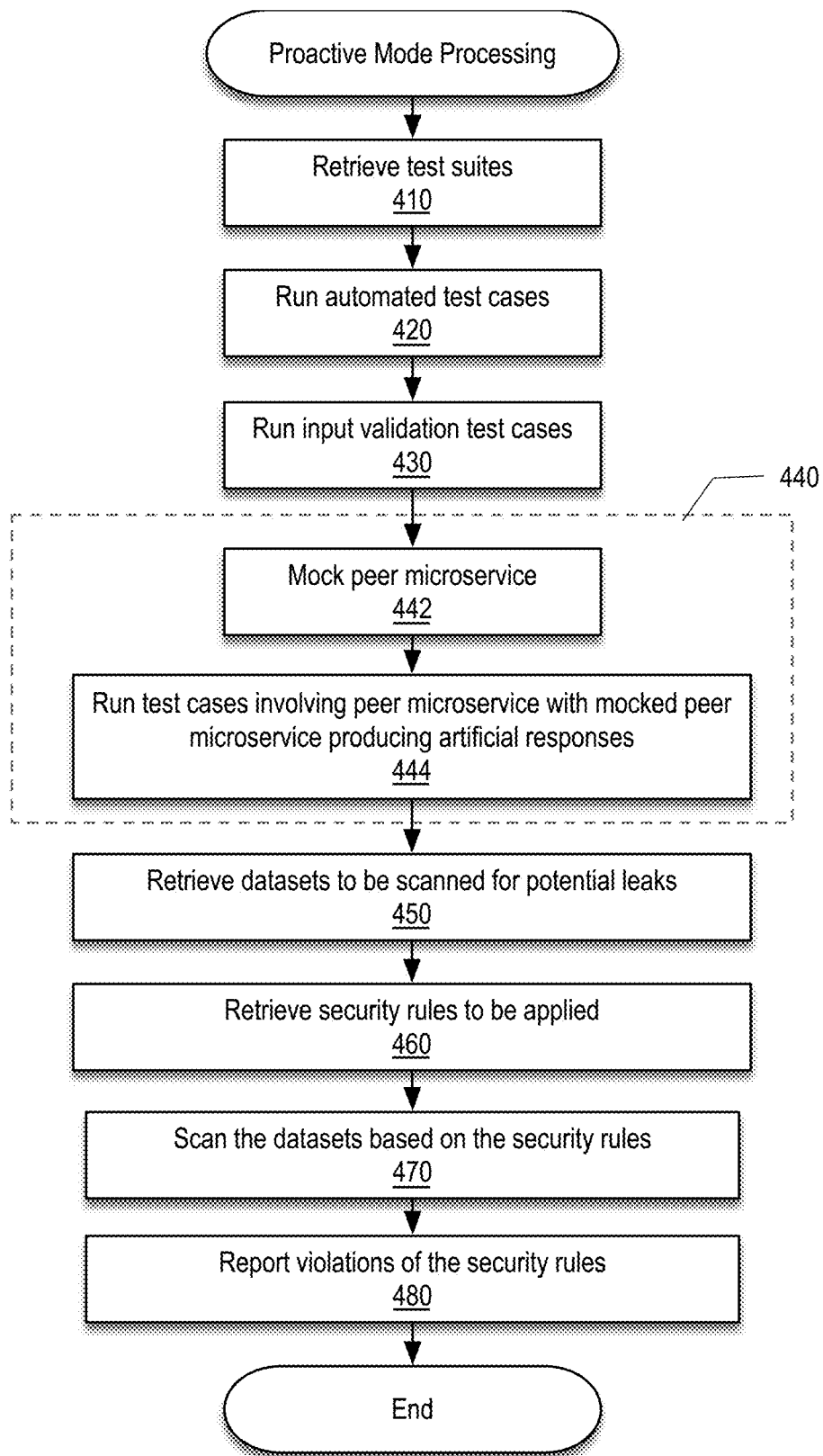
FIG. 4 is a flow diagram illustrating proactive mode processing in accordance with an example embodiment.

FIG. 4 is a flow diagram illustrating proactive mode processing in accordance with an example embodiment. In the context of the present example, a security leak detection service (e.g., engine 120) performs the flow of FIG. 4 to attempt to provoke a microservice under test to leak sensitive information by subjecting the microservice under test to various test cases.

At block 410, test suites are retrieved. For example, a security leak testing engine (e.g., security leak testing engine 125) may retrieve one or more test cases (e.g., automation test cases 141, input validation test cases 142, and/or service interaction test cases 143).

At block 420, automated test cases are run. For example, the security leak testing engine may subject the microservice under test to various automation test cases (e.g., automation test cases 141), which may have been previously imported into the security leak detection system during a setup phase by an administrator (e.g., DevOps administrator 121). In one embodiment, the automation test cases may represent automation tests previously developed by a QE team for validation of the microservice under test. In one embodiment, subjecting the microservice under test to the automation test cases causes the microservice under test to output results to generated datasets (e.g., files, error logs, debug logs, service logs, reports, stack traces, call stack traces, information presented to a user interface, and responses (e.g., error messages) generated by REST APIs of the microservice under test).

At block 430, input validation test cases are run. According to one embodiment, the input validation test cases (e.g., input validation test cases 142) represent a rigorous set of tests that fully exercise all REST calls that can be made to the microservice under test and cause the microservice under test to output results to the generated datasets (e.g., generated dataset 130).

At block 440, artificial responses of peer microservices are mimicked by mock peer services one by one. Block 440 may include blocks 442 and 444 discussed below At block 442, a current peer microservice of the peer microservices with which the microservice at issue interacts is mocked to return values to the microservice based on the input validation test cases.

At block 444, the test cases involving the current peer microservice are run with the mocked peer microservice providing the artificial responses produced at block 442 to the microservice undertest.

At block 450, the generated datasets to be scanned for potential leaks are retrieved. Depending upon the particular implementation, the predefined outputs and/or outputs defined by a security administrator of the microservice at issue that are to be analyzed may be captured and stored in the form of one or more of files, error logs, debug logs, service logs, reports, stack traces, call stack traces, and the like. As such, the retrieval may involve retrieving the generated datasets from their respective datastores.

At block 460, the security rules to be applied to the generated datasets are retrieved. For example, a security leak detector (e.g., security leak detector 126) may retrieve the security rules from the security rules database 115.

At block 470, the generated datasets are scanned based on the security rules. Depending upon the particular implementation the security rules may include one or more of the following:

There should be no leakage of credential or authorization tokens (e.g., an auth-token) or session tokens.

Failed call trace should not leak service component details (e.g., message broker endpoint, Identity and Access Management (IAM) endpoint, database table names, etc.).

Error messages, when a failure occurs, should be generic. For example, an error message should neither indicate the name of peer-services nor disclose their data to end users so that they gain insight about the system design (e.g., library version and service database details) and its functioning pattern.

Invalid input or stress testing should not fail the service. The service should gracefully reject such requests without exposing its internal details.

During failure, the service instance should not leave a session (e.g., a Hypertext Transport Protocol (HTTP) session, a database session, a shell session (e.g., Secure Shell (SSH)), for example, to access servers) open.

At block 480, violations of the security rules are reported. For example, if any string patterns and/or regular expressions corresponding to the rules listed above in block 470 are found in the generated datasets, appropriate personnel may be alerted (e.g., via email, text message or otherwise).

Figure 5:
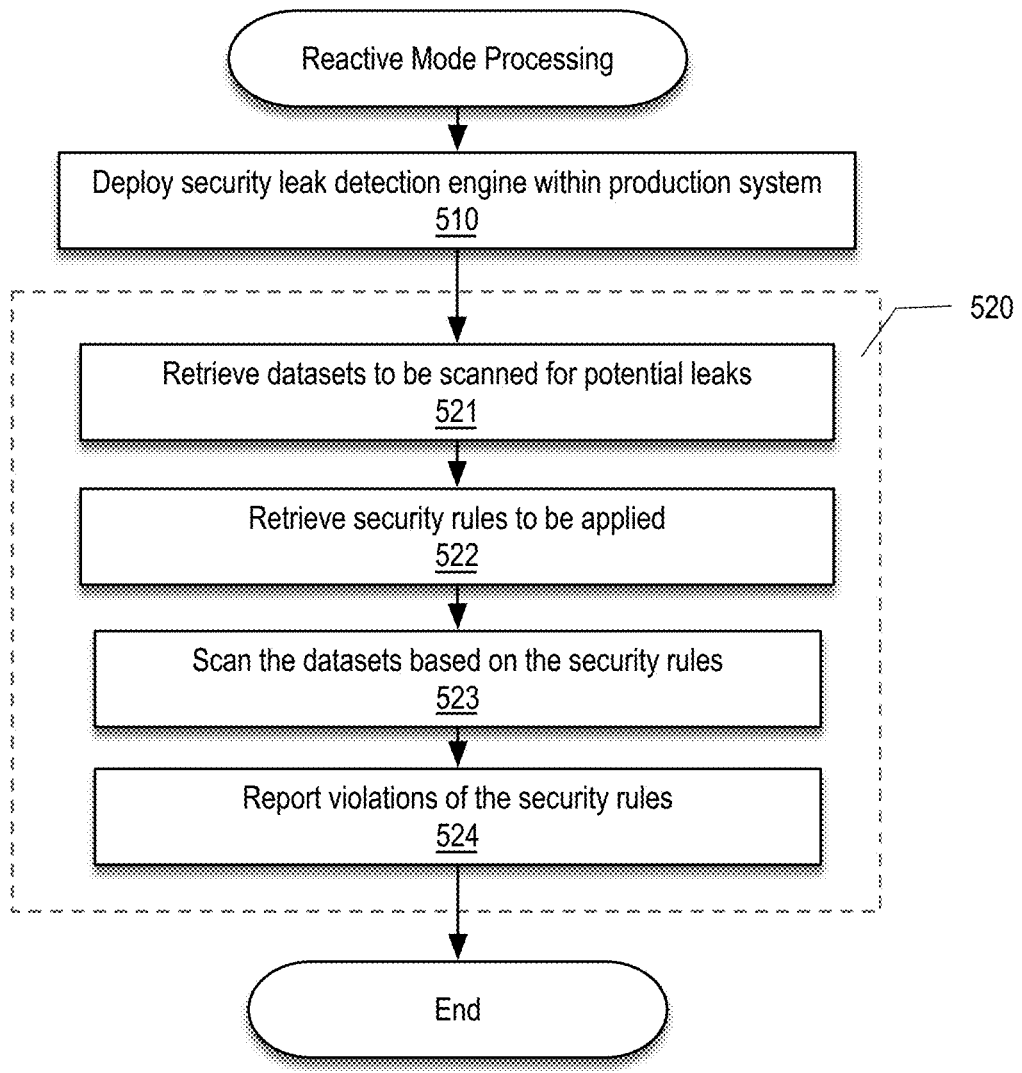
FIG. 5 is a flow diagram illustrating reactive mode processing in accordance with an example embodiment.

FIG. 5 is a flow diagram illustrating reactive mode processing in accordance with an example embodiment. In the context of the present example, a security leak detection service monitors predefined datasets generated by one or more microservices deployed within a production environment (e.g., production system 150). As the microservices perform production interactions, outputs of the microservices are captured within a generated dataset (e.g., generated dataset 160).

At block 510, a security leak detection engine is deployed within the production environment. According to one embodiment, a single instance of the security leak detection engine (e.g., security leak detection engine 151) may be deployed within the production environment regardless of the number of microservices.

At block 521, the datasets to be scanned for potential leaks are retrieved.

At block 522, the security rules to be applied to the datasets are retrieved. For example, a security leak testing engine (e.g., security leak testing engine 155) may retrieve the security rules from the security rules database 115.

At block 523, the datasets are scanned based on the security rules. According to one embodiment, the scanning parallels that described above with reference to block 470 of FIG. 4.

At block 524, violations of the security rules are reported. For example, if any string patterns and/or regular expressions corresponding to the security rules are found in the generated datasets, appropriate personnel may be alerted (e.g., via email, text message or otherwise).

In the context of the present example, dashed box 520 identifies those of the blocks that may be repeated on a periodic basis. Alternatively or additionally, the blocks within box 520 may be triggered responsive to an event (e.g., deployment of a new or updated microservice within the production environment, request by an administrator, etc.).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a non-transitory machine-readable storage medium tangibly embodying thereon instructions, which may be used to program a computer (or other electronic devices) to perform a process (including, e.g., processes described in FIGS. 2-5). The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 6:
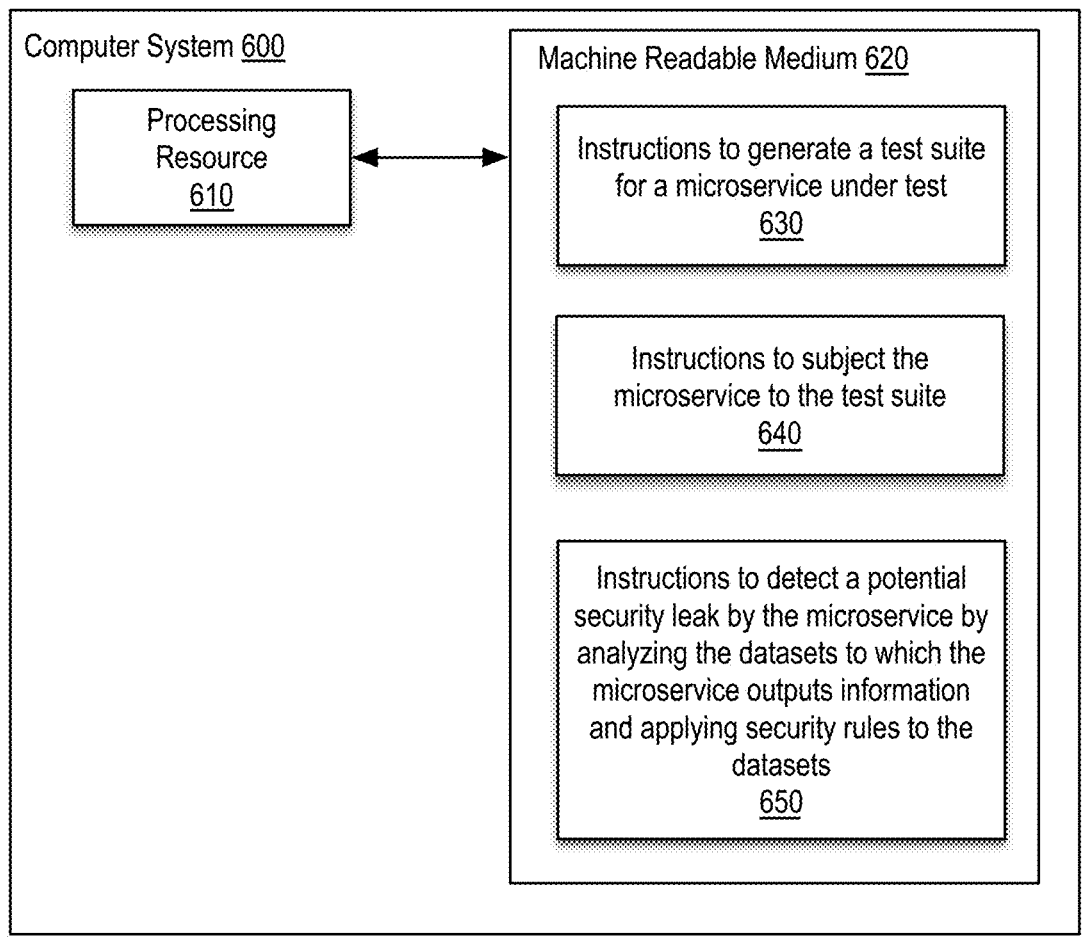
FIG. 6 is a block diagram of a computer system in accordance with an embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform microservice testing to determine whether a microservice leaks sensitive information. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-650. It should be understood that part or all of the executable instructions and/or electronic circuits included within one block may, in alternate implementations, be included in a different block shown in the figures or in a different block not shown.

Instructions 630, upon execution, cause the processing resource 610 to generate a test suite for a microservice under test. In one embodiment, instructions 630 may correspond generally to instructions for performing block 210 of FIG. 2.

Instructions 640, upon execution, cause the processing resource 610 to subject the microservice under test to the test suite. In one embodiment, instructions 640 may correspond generally to instructions for performing block 220 of FIG. 2.

Instructions 650, upon execution, cause the processing resource 610 to detect a potential security leak by the microservice by analyzing datasets to which the microservice outputs information and applying security rules to the datasets. In one embodiment, instructions 650 may correspond generally to instructions for performing the block 230 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
   prior to deployment of a microservice within a production environment, generating a test suite for the microservice based at least in part on a specification of an application programming interface (API) of the microservice defining a plurality of operations supported by the API and information regarding parameters of each of the plurality of operations, wherein the test suite comprises at least input validation test cases for testing the API of the microservice, and service interaction test cases that facilitate a mocked peer microservice to respond to requests made by the microservice;
   subjecting the microservice to the test suite including running the input validation test cases and the service interaction test cases, wherein the service interaction test cases test for leakage of sensitive information under both positive and negative response scenarios; and
   based on running the input validation test cases and the service interaction test cases, detecting a potential security leak by the microservice by analyzing a dataset to which the microservice outputs information, wherein analyzing the dataset includes applying a plurality of security rules to the dataset.

2. The method of claim 1, wherein the dataset includes error log files of a service instance of which the microservice is a part.

3. The method of claim 1, wherein the dataset includes a stack trace of a service instance of which the microservice is a part.

4. The method of claim 1, wherein the dataset includes output to a user interface associated with a service instance of which the microservice is a part.

5. The method of claim 1, wherein the dataset includes responses generated by the plurality of operations.

6. The method of claim 1, wherein the plurality of security rules test for a plurality of security leak patterns.

7. A non-transitory machine readable medium storing instructions executable by a processing resource of a computer system, the non-transitory machine readable medium comprising instructions to:
   prior to deployment of a microservice within a production environment, generate a test suite for the microservice based at least in part on a specification of an application programming interface (API) of the microservice defining a plurality of operations supported by the API and information regarding parameters of each of the plurality of operations, wherein the test suite comprises at least input validation test cases for testing the API of the microservice, and service interaction test cases that facilitate a mocked peer microservice to respond to requests made by the microservice;
   subject the microservice to the test suite including running the input validation test cases and the service interaction test cases, wherein the service interaction test cases test for leakage of sensitive information under both positive and negative response scenarios; and
   based on running the input validation test cases and the service interaction test cases, detect a potential security leak by the microservice by analyzing a dataset to which the microservice outputs information, wherein analyzing the dataset includes applying a plurality of security rules to the dataset.

8. The non-transitory machine readable medium of claim 7, wherein the dataset includes error log files of a service instance of which the microservice is a part.

9. The non-transitory machine readable medium of claim 7, wherein the dataset includes a stack trace of a service instance of which the microservice is a part.

10. The non-transitory machine readable medium of claim 7, wherein the dataset includes output to a user interface associated with a service instance of which the microservice is a part.

11. The non-transitory machine readable medium of claim 7, wherein the dataset includes responses generated by the plurality of operations.

12. The non-transitory machine readable medium of claim 7, wherein the plurality of security rules test for a plurality of security leak patterns.

13. The non-transitory machine readable medium of claim 12, wherein the plurality of security leak patterns include leakage of credentials, authorization tokens, or session tokens.

14. The non-transitory machine readable medium of claim 12, wherein the plurality of security leak patterns include leakage of information relating to a service component of a service instance of which the microservice is a part.

15. The non-transitory machine readable medium of claim 14, wherein the service component includes a message broker endpoint, an Identity and Access Management (IAM) endpoint, or a database table.

16. The non-transitory machine readable medium of claim 12, wherein the plurality of security leak patterns include leakage of information relating to internal system design or functioning of a service instance of which the microservice is a part.

17. The non-transitory machine readable medium of claim 16, wherein the information relating to internal system design or functioning of the service instance includes a name of a peer microservice of the microservice or data associated with the peer microservice.

18. The non-transitory machine readable medium of claim 12, wherein the plurality of security leak patterns include leakage of information relating to internals of the microservice.

19. The non-transitory machine readable medium of claim 7, wherein the information regarding the parameters of each of the plurality of operations includes types of the parameters, formats of the parameters, valid ranges of values of the parameters, and whether the parameters are required or optional.

20. A system comprising:
a processing resource; and
a non-transitory computer-readable medium, coupled to the processing resource, having stored therein instructions that when executed by the processing resource cause the processing resource to:
prior to deployment of a microservice within a production environment, generate a test suite for the microservice based at least in part on a specification of an application programming interface (API) of the microservice defining a plurality of operations supported by the API and information regarding parameters of each of the plurality of operations, wherein the test suite comprises at least input validation test cases for testing the API of the microservice, and service interaction test cases that facilitate a mocked peer microservice to respond to requests made by the microservice;
subject the microservice to the test suite including running the input validation test cases and the service interaction test cases, wherein the service interaction test cases test for leakage of sensitive information under both positive and negative response scenarios; and
based on running the input validation test cases and the service interaction test cases, detect a potential security leak by the microservice by analyzing a dataset to which the microservice outputs information, wherein analyzing the dataset includes applying a plurality of security rules to the dataset.

21. The computer-implemented method of claim 1, further comprising auto-generating the input validation test cases based on at least one of boundary value analysis or equivalence partitioning.

22. The non-transitory machine readable medium of claim 7, further comprising instructions to auto-generate the input validation test cases based on at least one of boundary value analysis or equivalence partitioning.

23. The system of claim 20, further comprising instructions that when executed by the processing resource cause the processing resource to auto-generate the input validation test cases based on at least one of boundary value analysis or equivalence partitioning.

* * * * *